United States Patent [19]
Campbell et al.

[11] Patent Number: 5,859,808
[45] Date of Patent: Jan. 12, 1999

[54] SYSTEM AND METHOD FOR STEERING FRESNEL REGION DATA TO ACCESS DATA LOCATIONS IN A HOLOGRAPHIC MEMORY

[75] Inventors: Scott Patrick Campbell, Chatham; Kevin Richard Curtis, Summit; Michael C. Tackitt, Califon, all of N.J.

[73] Assignee: Lucent Technologies Inc., Murray Hill, N.J.

[21] Appl. No.: 881,736

[22] Filed: Jun. 24, 1997

[51] Int. Cl.⁶ .................................................. G11C 13/04
[52] U.S. Cl. ........................... 365/216; 365/125; 359/11; 359/29; 359/32
[58] Field of Search ..................... 365/216, 125; 359/11, 29, 32

[56] References Cited

U.S. PATENT DOCUMENTS 4,550,395  10/1985  Carlson .................................. 369/103
5,481,523  1/1996  Dewald .................................. 369/103

Primary Examiner—David C. Nelms
Assistant Examiner—Andrew Q. Tran

[57] ABSTRACT

Systems and methods for steering an optical path to gain access to data locations in a holographic memory cell (HMC). One of the systems includes: (1) a refractive element that receives a complex, spatially-modulated incident beam of light, (2) first and second reflective elements locatable to receive and reflect the incident beam in a Fresnel region thereof and (3) a reflective element steering mechanism, coupled to the first and second reflective elements, that moves the first and second reflective elements in tandem to steer the incident beam with respect to the HMC thereby to cause the incident beam to illuminate a location on the HMC that is a function of a movement of the first and second reflective elements.

20 Claims, 6 Drawing Sheets

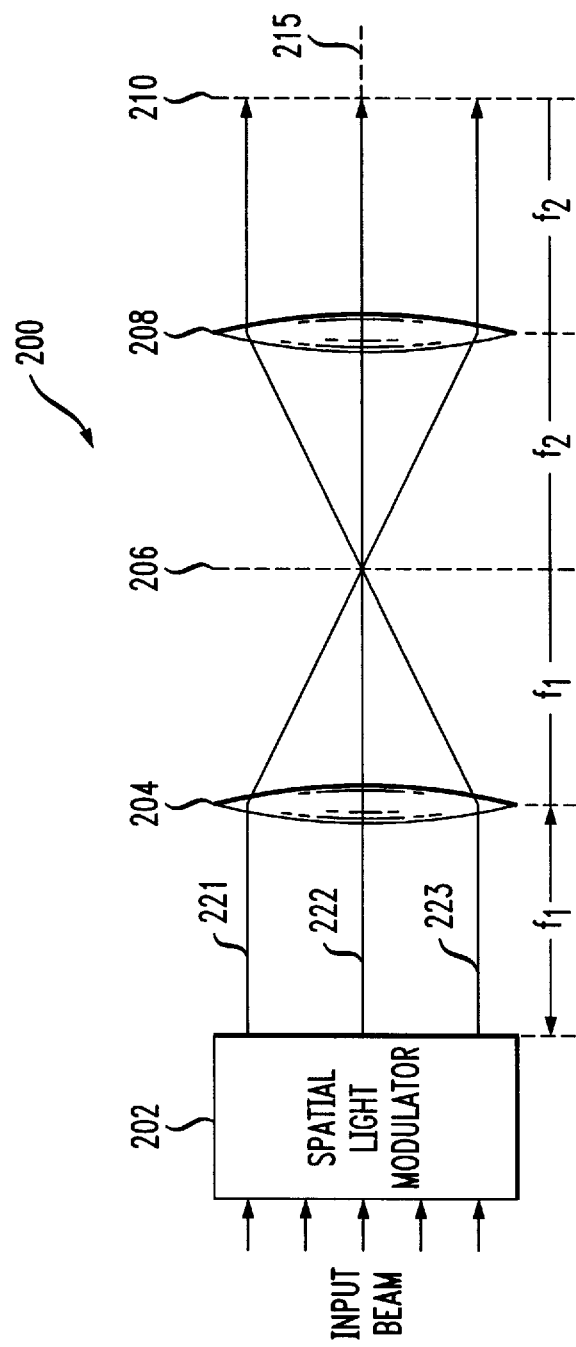

SYSTEM AND METHOD FOR STEERING FRESNEL REGION DATA TO ACCESS DATA LOCATIONS IN A HOLOGRAPHIC MEMORY

CROSS-REFERENCE TO RELATED APPLICATIONS

The present invention is related to that disclosed in:

1. U.S. patent application Ser. No. 08/881,579, entitled "System and Method Using Linear Translation to Access Data Locations in a Holographic Memory" and filed concurrently herewith;
2. U.S. patent application Ser. No. 08/881,540, entitled "System and Method For Steering Focal Plane Data to Access Data Locations in a Holographic Memory" and filed concurrently herewith;
3. U.S. patent application Ser. No. 08/881,866, entitled "System and Method for Precessing an Optical Path Using Cylindrical Coordinates to Access Data Locations in a Holographic Memory" and filed concurrently herewith;
4. U.S. patent application Ser. No. 08/881,572, entitled "System and Method for Steering Focal Plane Data Using Cylindrical Coordinates to Access Data Locations in a Holographic Memory" and filed concurrently herewith; and
5. U.S. patent application Ser. No. 08/881,404, entitled "System and Method for Steering Fresnel Region Data Using Cylindrical Coordinates to Access Data Locations in a Holographic Memory" and filed concurrently herewith.

Each reference is commonly assigned with the present invention.

TECHNICAL FIELD OF THE INVENTION

The present invention is directed, in general, to holographic memory cells and, more specifically, to an optical system for accessing data locations in a holographic memory cell.

BACKGROUND OF THE INVENTION

Most modern processing systems, including personal computers (PCs), rely on one form or another of optical data storage. For example, CD-ROM drives are now standard equipment on nearly all new PCs. Nearly all multimedia software, including video games, maps, encyclopedias, and the like, are sold on CD-ROM. Also, compact discs are the most prevalent storage medium for musical recording. More recently, digital video disc (DVD) technology has been introduced that will expand the storage capacity of standard CD technology from about one-half gigabyte to about five gigabytes.

The large storage capacities and relatively low costs of CD-ROMs and DVDs have created an even greater demand for still larger and cheaper optical storage media. Many large businesses rely on jukebox-style CD changers in order to access a particular one of potentially hundreds of discs. Motion pictures released in optical storage format still require multiple CDs, DVDs or oversized laser discs. However, it appears that the limits of CD-ROM and DVD technology are being reached. In order to continue to improve the capacity and speed of optical storage systems, research increasingly focuses on holographic storage devices capable of storing hundreds of gigabytes in a CD-sized storage medium.

A number of holographic data storage systems have been developed that are capable of storing and retrieving an entire page of data at a time. In these systems, data to be stored is first encoded in a two dimensional (2D) optical array, for example on a liquid crystal display (LCD) screen, which is one type of spatial light modulator (SLM). Another type of SLM is Texas Instruments' Digital Mirror Device, which is a reflective device that allows the reflectivity of each pixel to be changed. The term "SLM" also includes fixed masks of varying optical density, phase, or reflectivity.

A first laser beam, a plane wave, is transmitted through the SLM and picks up an intensity and/or phase pattern from the data squares and rectangles (pixels) in the 2D array. This data-encoded beam, called an object beam, is ultimately projected onto and into a light-sensitive material, called a holographic memory cell (HMC). A second laser beam, called a reference beam, is also projected onto and into the holographic memory cell. The object beam and the reference beam then cross at the HMC to produce an interference pattern throughout a volume element of the HMC. This unique interference pattern induces material alterations in the HMC that generate a hologram.

The formation of the hologram in the holographic memory cell is a function of the relative amplitudes and polarization states of, and the phase differences between, the object beam and the reference beam. It is also highly dependent on the incident angles at which the object beam and the reference beam were projected onto the holographic memory cell. After hologram storage, the data beam may be reconstructed by projecting into the HMC a reference beam that is the same as the reference beam that produced the hologram. The hologram and the reference beam then interact to reproduce the data-encoded object beam, which may then be projected onto a two-dimensional array of light sensitive detectors which read back the data by sensing the pattern of light and dark pixels.

The object beam produced by the spatial light modulator has a high space-bandwidth product (SBP). The SBP of a beam is equal to the number of resolvable pixels the beam contains. For example, the 800×600 pixel image produced by a SVGA computer monitor has a SBP of 480,000. When high SBP beams are projected into a holographic memory cell, it is important to keep the optical path lengths traversed by the beams constant. Otherwise, the high SBP image will go out of focus and the data will be lost.

Maintaining a constant optical path length in order to keep the high SBP image of the object beam in focus necessarily makes it difficult to steer the object beam to different areas on the surface of the holographic memory cell, because such steering frequently causes the optical path length to change. However, many holographic memory systems incorporate reference beams whose SBP=1. Because of the small reference beam SBP, such a holographic data storage system can project its reference beam through an acousto-optic cell, which diffracts the reference beam through an optical system, such as a 4-f imaging system, that has a fixed optical path length. Altering the frequency of the acoustic wave changes the angle at which the reference beam is diffracted and therefore incident to the surface of the holographic memory cell. Systems utilizing such angle-tuned reference beam steering are known as "angle multiplexing" systems and are distinguished by their capability to project different pages of data into the same location on the surface of the holographic memory cell, but at different angles of reference-beam incidence. The data is then retrieved by steering the interrogating reference beam at different angles of incidence. However, these prior art systems are inadequate to steer a high SBP beam, such as a typical object beam, to different areas of the holographic memory cell because of their inherent limitations with respect to space-bandwidth product throughput. These prior art systems are also limited in their capability to accurately position a high SEP object or reference beam at a desired position on the holographic memory cell.

Accordingly, there is a need in the art for improved optical systems that are capable of steering high space-bandwidth product beams to different regions on the surface of a holographic memory cell without causing the beam to lose focus. There is a further need in the art for improved optical systems capable of steering high space-bandwidth product images in more than one dimension in a coordinate system. There is a still further need in the art for improved optical systems capable of steering complex reference beams in more than one dimension in a coordinate system.

SUMMARY OF THE INVENTION

To address the above-discussed deficiencies of the prior art, the present invention provides systems and methods for steering a complex, spatially-modulated incident beam of coherent light to gain access to data locations in an HMC. One of the systems includes: (1) a refractive element that receives said incident beam, (2) first and second reflective elements locatable to receive and reflect the incident beam in a Fresnel region thereof and (3) a reflective element steering mechanism, coupled to the first and second reflective elements, that moves the first and second reflective elements in tandem to steer the incident beam with respect to the HMC thereby to cause the incident beam to illuminate a location on the HMC that is a function of a movement of the first and second reflective elements.

The present invention therefore introduces the broad concept of moving a duality of reflective elements, such as mirrors, and rotating a HMC to read or write to different locations on the HMC.

In one embodiment of the present invention, the reflective element steering mechanism rotates the first and second reflective elements about first and second axes, respectively. In an alternative embodiment, the reflective element steering mechanism translates the first and second reflective elements in tandem.

In one embodiment of the present invention, the system further comprises: (1) third and fourth reflective elements locatable to receive and reflect the incident beam from the second reflective element in a Fresnel region thereof and (2) a second reflective element steering mechanism, coupled to the third and fourth reflective elements, that moves the third and fourth reflective elements in tandem to steer the incident beam with respect to the HMC in two dimensions thereby to cause the incident beam to illuminate a location on a plane the HMC that is a function of a movement of the first and second reflective elements. One embodiment to be illustrated and described employs four reflective elements to provide Cartesian or Euclidian steering for a beam of light.

In one embodiment of the present invention, the HMC is substantially planar. However, the present invention is employable with nonplanar HMCs, should they be advantageous in a given application.

The foregoing has outlined, rather broadly, various embodiments of the present invention so that those skilled in the art may better understand the detailed description of the invention that follows. More specific embodiments of the invention will be described hereinafter that form the subject of the claims of the invention. Those skilled in the art should appreciate that they can readily use the disclosed conception and specific embodiments as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 2 illustrates a conventional 4-f (four-f) imaging system;

DETAILED DESCRIPTION

Figure 1A:
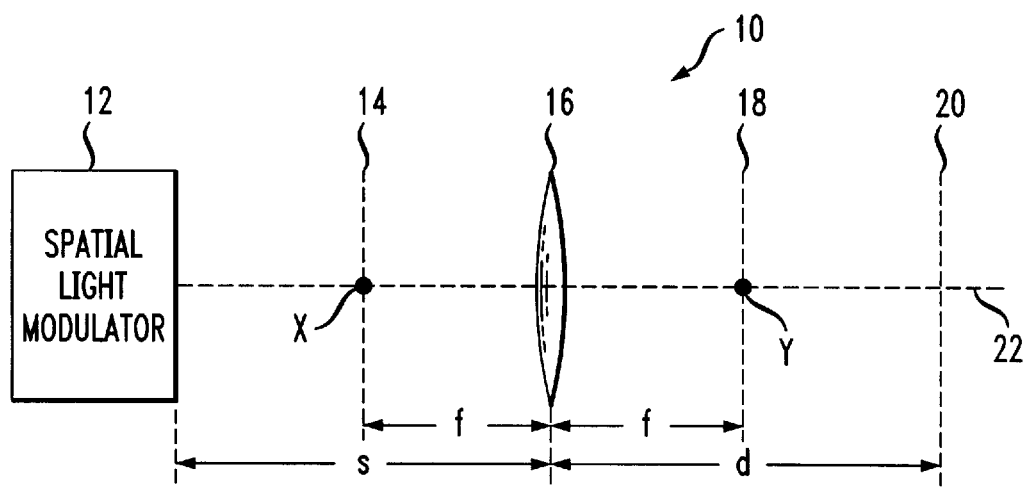
FIG. 1A illustrates a conventional single lens imaging system.

FIG. 1A illustrates a conventional single lens imaging system 10. Although single lens systems are well known, single lens system 10 is described here in detail so that the descriptions of the present invention which follow may be more clearly understood. Single lens system 10 comprises spatial light modulator (SLM) 12 and thin convex lens 16. Lens 16 has two focal points. Focal point X lies in plane 14, shown as a dotted line, one focal length, f, away from lens 16. On the opposite side of lens 16, focal point Y lies in plane 18, shown as a dotted line, one focal length, f, away from lens 16. SLM 12 comprises, for example, a liquid crystal display (LCD) screen on which data is encoded in a two-dimensional (2D) pattern of transparent and opaque pixels. SLM 12 and lens 16 are positioned orthogonally to optical path 22, shown as a dotted line. If a thin lens having a focal length, f, is positioned at a distance, s, from an input object, the lens will form an output image at a distance, d, on the opposite side of the lens, according to the thin lens equation: $1/f=(1/s+1/d)$. In the configuration shown in FIG. 1A, SLM 12 is positioned at a distance, s, from lens 16, so that the output image of SLM 12 is formed at plane 20, shown as a dotted line, at a distance, d, away from lens 16. In selected embodiments of the present invention described below, s, d, and f are selected so that s=d=2f, and the total separation, s+d, between SLM 12 and its output image is therefore 4f.

Figure 1B:
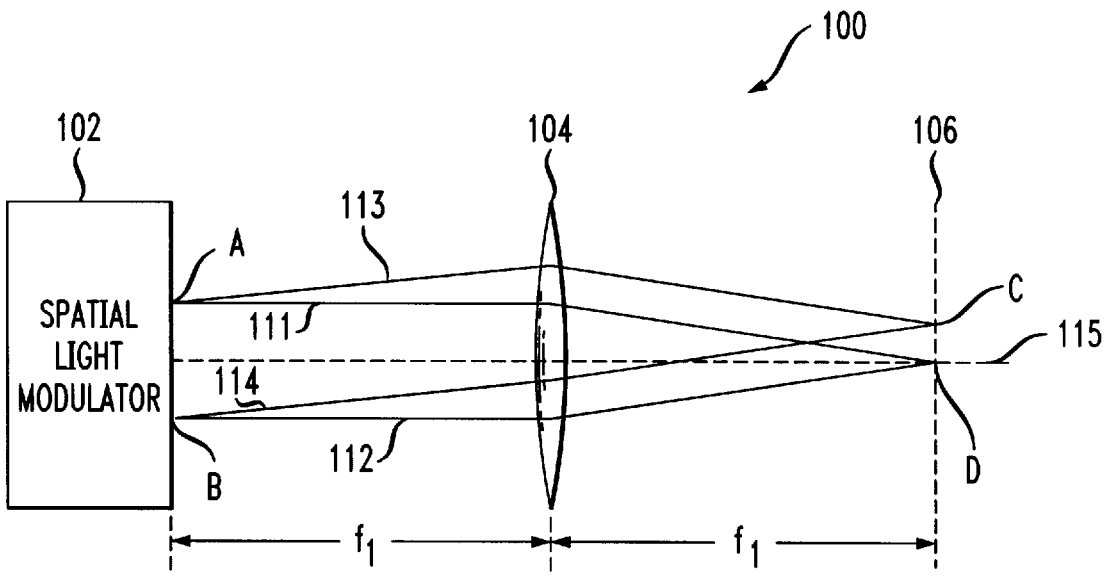
FIG. 1B illustrates a conventional single lens Fourier transforming system.

FIG. 1B illustrates a conventional single lens Fourier transforming system 100. Although Fourier transforms of input objects are well known, Fourier transform system 100 is described here in detail so that the descriptions of the present invention which follow may be more clearly understood. An object beam of coherent laser light is projected through SLM 102 and picks up the encoded data pattern and propagates distance $f_1$ to reach lens 104. The object beam passes through lens 104 and propagates distance $f_1$ again to reach Fourier plane 106. At the Fourier plane, all of the object beam's positional information becomes angular information and all of the object beam's angular information becomes positional information.

This phenomenon may be understood by reference to light beams 111 and 113, which emanate from point A on SLM 102, and to light beams 112 and 114, which emanate from point B on SLM 102. The small pixels in the 2D-array pattern on SLM 102 form small apertures that cause diffraction of the object beam as it passes through SLM 102. Thus, light emanates outward from points A and B over a broad range of directions. Light beams 111 and 112 are parallel to one another and propagate perpendicularly outward from SLM 102. Light beams 113 and 114 are also parallel to one another but propagate outward at an oblique angle from SLM 102. Since light beams 111 and 112 are parallel, their angles of incidence at lens 104 are the same. Similarly, since light beams 113 and 114 are parallel, their angles of incidence at lens 104 are the same.

As is well known, it is a property of a thin lens, such as lens 104, that parallel light beams that pass through the lens are focused (converged) by the lens to the same point at the Fourier plane. Thus, parallel beams 111 and 112 converge at point D in Fourier plane 106, even though beams 111 and 112 emanate from different points at SLM 102. Similarly, parallel beams 113 and 114 converge at point C in Fourier plane 106, even though beams 113 and 114 emanate from different points at SLM 102.

It is also a property of a thin lens, such as lens 104, that light beams emanating at different angles (i.e., nonparallel) from the same point at the input object (SLM 102) become parallel light beams after passing through the thin lens. Thus, light beams 111 and 113, which emanate at different angles (i.e., nonparallel) from point A at SLM 102, become parallel to each other after passing through lens 104 and therefore have the same angles of incidence at points C and D in Fourier plane 106. Likewise, light beams 112 and 114, which emanate at different angles (i.e., nonparallel) from point B at SLM 102, become parallel to each other after passing through lens 104 and therefore have the same angles of incidence at points C and D in Fourier plane 106.

From the foregoing, it can be seen that the position at which a beam of light is incident on Fourier plane 106 is determined by the angle (not the position) at which it left SLM 102. Similarly, it can be seen that the angle at which a beam of light is incident on Fourier plane 106 is determined by the position (not the angle) at which it left SLM 102. Therefore, as was stated above, at the Fourier plane, all of the object beam's positional information becomes angular information and all of the object beam's angular information becomes positional information.

FIG. 2 illustrates a conventional 4-f (four f) imaging system 200. The configuration of 4-f imaging system 200 shown in FIG. 2 is referred to as "infinite conjugate." Although 4-f imaging systems are well known, 4-f imaging system 200 is described here in detail so that the descriptions of the present invention which follow may be more clearly understood. 4-f imaging system 200 comprises spatial light modulator (SLM) 202, thin convex lens 204, which has a focal length, $f_1$, and thin convex lens 208, which has a focal length, $f_2$, where $f_1$ and $f_2$ may or may not be equal. SLM 202 comprises, for example, a liquid crystal display (LCD) screen on which data is encoded in a 2D-array pattern of transparent and opaque pixels. SLM 202, lens 204 and lens 208 are positioned orthogonally to optical path 215, shown as a dotted line coincident with solid line 222.

A plane wave object beam of coherent laser light is projected through SLM 202, picks up the encoded data pattern, and propagates distance $f_1$ to reach lens 204. The object beam, represented by light beams 221–223, passes through lens 204 and propagates distance $f_1$ again to reach Fourier plane 206. As explained above with respect to FIG. 1B, at Fourier plane 206, all of the object beam's positional information becomes angular information and all of the object beam's angular information becomes positional information.

The image formed at Fourier plane 206 is the input object for lens 208. From Fourier plane 206, the object beam propagates distance $f_2$ to reach lens 208. After passing through lens 208, the object beam finally propagates distance $f_2$ to reach output image plane 210, where the input data image at SLM 202 is reconstructed. Output image plane 210 is the Fourier plane for plane 206, as well as the output image plane for the plane in which SLM 202 lies. Thus, the image formed at output image plane 210 by lens 208 is the Fourier image of the Fourier image formed at Fourier plane 206 by lens 204.

As light beams 221–223 show, the input data image formed at output image plane 210 is inverted with respect to its appearance at SLM 202. Therefore, if a holographic memory cell was positioned at output image plane 210, the inverted image of the 2D-array pattern at SLM 202 would be stored as a page of data in the holographic memory cell. A separate reference beam of laser light (not shown) would be required in order to store the data image.

In alternate embodiments of the above-described optical systems, the spatial light modulator may be positioned between the initial lens and the following Fourier plane. An object beam that is incident to the initial lens will be converged by the initial lens, but will pick up the encoded data from the SLM after, rather than before, the initial lens. In such a configuration, the size (positions) of the Fourier orders vary linearly with the distance between the SLM and the following Fourier plane. Additionally, the incident angles of the beams will vary according to the position of the SLM.

The beam steering systems disclosed in the co-pending applications filed concurrently with the present disclosure translate or angularly rotate focal planes containing image data or Fourier transform data at the surface of holographic memory cells. These systems generally comprise one or more mirrors and at least one refractive element, such as a convex lens. If, however, lensless steering is desired, then Fresnel region steering can be utilized. The Fresnel region is the region between a lens and the following Fourier focal plane or image focal plane located one focal length, f, away from the lens. In Fresnel region steering, two movable mirrors are placed between one of the lenses in an optical system and the corresponding following Fourier or image focal plane. Advantageously, no additional optics (i.e., lenses) are needed after the pair of moving mirrors in order to complete the steering process.

Figure 3:
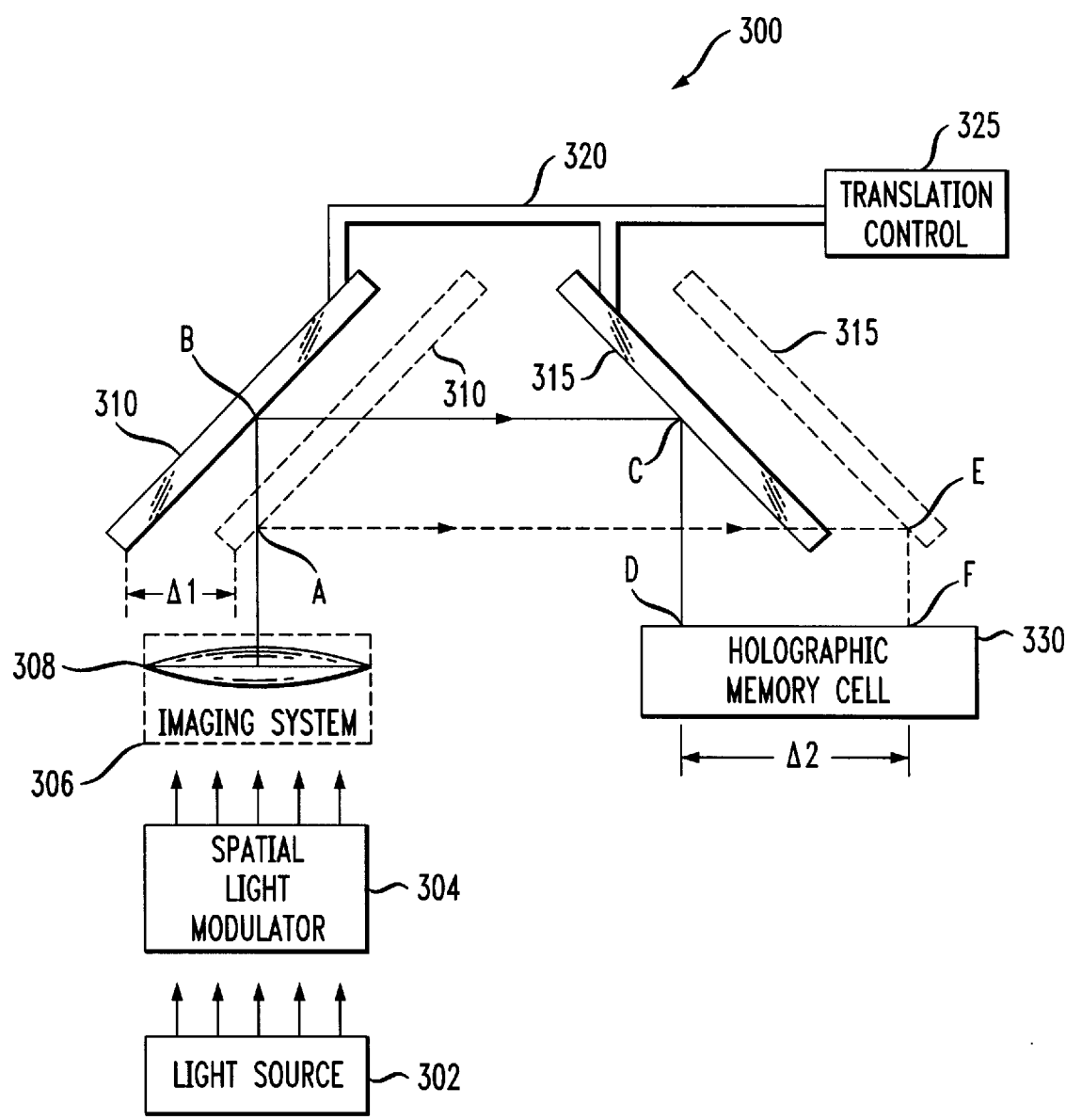
FIG. 3 illustrates a Fresnel region beam steering system according to a first embodiment of the present invention.

FIG. 3 illustrates Fresnel region beam steering system 300 according to a first embodiment of the present invention. Beam steering system 300 comprises light source 302, spatial light modulator 304, imaging system 306, translating mirrors 310 and 315 and holographic memory cell (HMC) 330. Beam steering system 300 also includes translation control 325 and drive arm 320. Light source 302 emits a plane wave object beam, such as a beam of coherent laser light, towards spatial light modulator (SLM) 304. SLM 304 comprises, for example, a liquid crystal display (LCD) screen on which data is encoded in a two-dimensional (2D) pattern of transparent and opaque pixels. The data-encoded object beam then passes through imaging system 306, such as the single lens imaging system in FIG. 1A, or the 4-f imaging system in FIG. 2.

Lens 308 is representative of the last lens in imaging system 306 through which the object beam passes and therefore may be the equivalent of lens 16 in FIG. 1A or the equivalent of lens 208 in FIG. 2. The object beam, shown as a solid line and as a dotted line, is reflected by mirror 310 towards mirror 315, which reflects the object beam onto HMC 330.

Mirror 310 and mirror 315 are rigidly mounted on drive arm 320 in fixed positions. Therefore, the relative separation between mirror 310 and mirror 315 is fixed and the relative angle formed by the surfaces of mirror 310 and mirror 315 is also fixed, even as mirror 310 and mirror 315 are translated. The object beam is imaged onto HMC 330 after reflecting off mirror 310 and mirror 315. HMC 330 and mirror 315 are relatively positioned with respect to one another such that the surface of HMC 330 is oriented orthogonally to the object beam reflected from mirror 315. The image that is incident on the surface of HMC 330 may be, for example, the image or Fourier transform of the incoming object beam, or may be some intermediate plane in the Fresnel region.

The original positions of mirror 310 and mirror 315 are shown as solid lines. The translated positions of mirror 310 and mirror 315 are shown as dotted lines. Translation control 325 extends or retracts drive arm 320 in order to move mirror 310 and mirror 315 in tandem. In the original positions of mirror 310 and 315, the object beam passes through point A and is incident on the surface of mirror 310 at point B. The object beam is then reflected to point C on mirror 315, where it is again reflected towards point D on the surface of HMC 330. As stated previously, the object beam is orthogonal to HMC 330 at point D.

In the translated positions of mirror 310 and 315, the object beam is incident on the surface of mirror 310 at point A and is then reflected to point E on the surface of mirror 315. At point E, the object beam is again reflected towards point F on the surface of HMC 330. As stated previously, the object beam is orthogonal to HMC 330 at point F. The critical aspect is that the distance traversed by the object beam from point A to point D (through intermediate points B and C) is the same as the distance traversed by the object beam from point A to point F (through intermediate point E). Translation by an amount $\Delta 1$ of mirrors 310 and 315 results in translation by an amount $\Delta 2$ at HMC 330. The amount of the translation $\Delta 2$ depends on the relative orientations of mirrors 310 and 315 as well as their absolute positions.

Figure 4:
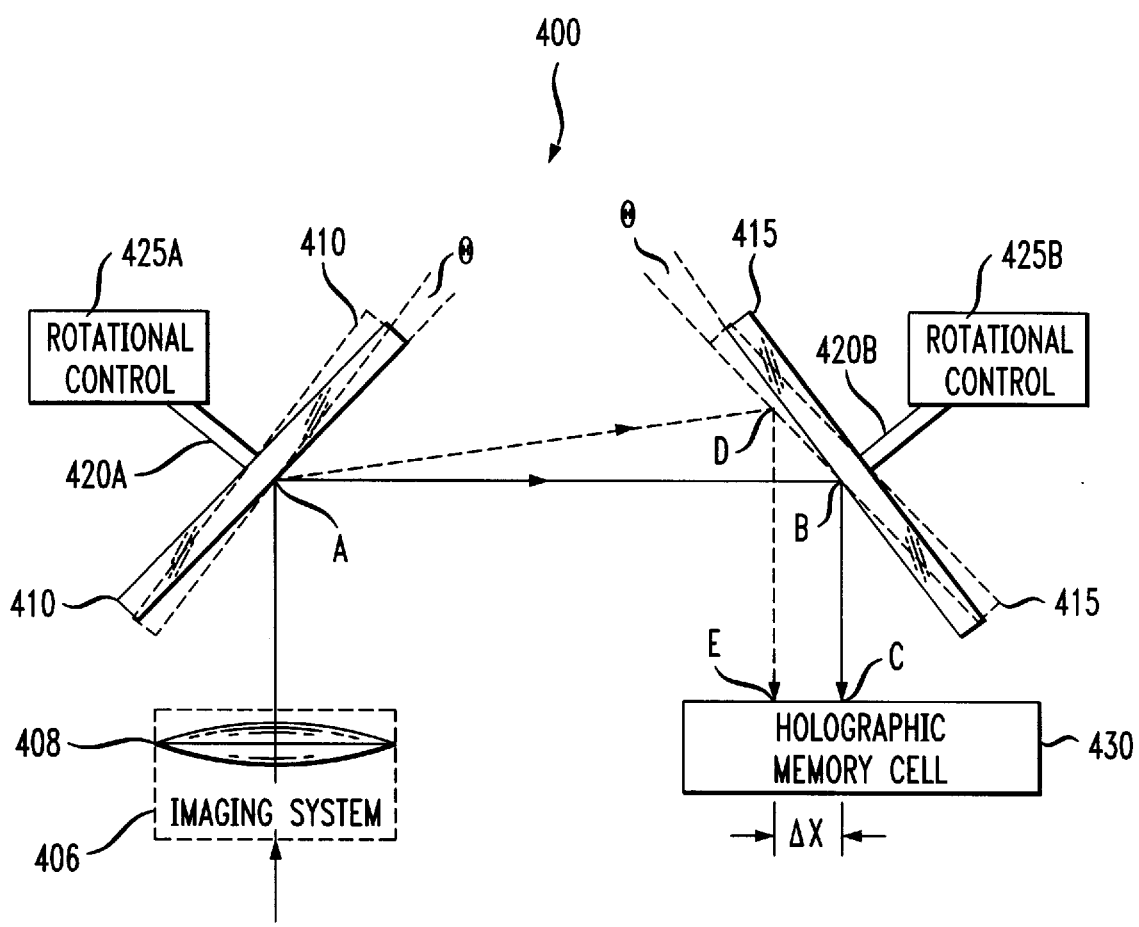
FIG. 4 illustrates a Fresnel region beam steering system according to a second embodiment of the present invention.

FIG. 4 illustrates Fresnel region beam steering system 400 according to a second embodiment of the present invention. Beam steering system 400 uses rotating mirrors, rather than translating mirrors to steer the object beam. Like beam steering system 300, beam steering system 400 comprises a light source and a spatial light modulator. For simplicity, these devices are not shown. Beam steering system 400 also comprises imaging system 406, rotating mirrors 410 and 415 and holographic memory cell (HMC) 430. Beam steering system 400 also includes rotational controls 425A and 425B and drive arms 420A and 420B.

The light source (not shown) emits an object beam that passes through the spatial light modulator (not shown). The data-encoded object beam then passes through imaging system 406, such as the single lens imaging system in FIG. 1A, or the 4-f imaging system in FIG. 2. Lens 408 is representative of the last lens in imaging system 406 through which the object beam passes and therefore may be the equivalent of lens 16 in FIG. 1A or the equivalent of lens 208 in FIG. 2. The object beam, shown as a solid line and as a dotted line, is reflected by mirror 410 towards mirror 415, which reflects the object beam onto HMC 430.

Mirror 410 and mirror 415 are rotationally mounted on drive arms 420A and 420B such that the distance between the centers of the surfaces of mirrors 410 and 415 is fixed and such that the angle formed by the planes in which the surfaces of mirrors 410 and 415 lie remains constant as mirrors 410 and 415 are rotated. Therefore, the relative separation between mirror 410 and mirror 415 is fixed and the relative angle formed by the surfaces of mirror 310 and mirror 315 is also fixed.

The object beam is imaged onto HMC 430 after reflecting off mirror 410 and mirror 415. HMC 430 may be oriented orthogonally to the object beam reflected from mirror 415. The image that is incident on the surface of HMC 430 may be, for example, the image or Fourier transform of the incoming object beam, or may be some intermediate plane in the Fresnel region.

The original positions of mirror 410 and mirror 415 are shown as solid lines. The rotated positions of mirror 410 and mirror 415 are shown as dotted lines. Rotational controls 425A and 425B cause drive arms 420A and 420B to rotate mirror 410 and mirror 415 the same amount in order to keep the relative angle formed by the surfaces of the mirrors constant. In the original positions of mirror 410 and 415, the object beam is incident on the surface of mirror 410 at point A and is reflected toward mirror 415. The object beam is incident on the surface of mirror 415 at point B, where it is again reflected towards point C on the surface of HMC 430. As stated previously, the object beam is orthogonal to HMC 430 at point C.

In the rotated positions of mirror 410 and 415, the object beam is incident on the surface of mirror 410 at point A and is then reflected to point D on the surface of mirror 415. At point D, the object beam is again reflected towards point E on the surface of HMC 430. As stated previously, the object beam is orthogonal to HMC 430 at point E. The critical aspect is that the distance traversed by the object beam from point A to point C (through intermediate point B) is the same as the distance traversed by the object beam from point A to point E (through intermediate point D). Rotation by an angular amount $\theta$ of mirrors 410 and 415 results in translation by an amount $\Delta X$ at HMC 430. The amount of translation $\Delta X$ depends on the relative orientations of mirrors 410 and 415 as well as their absolute orientations.

Figure 5:
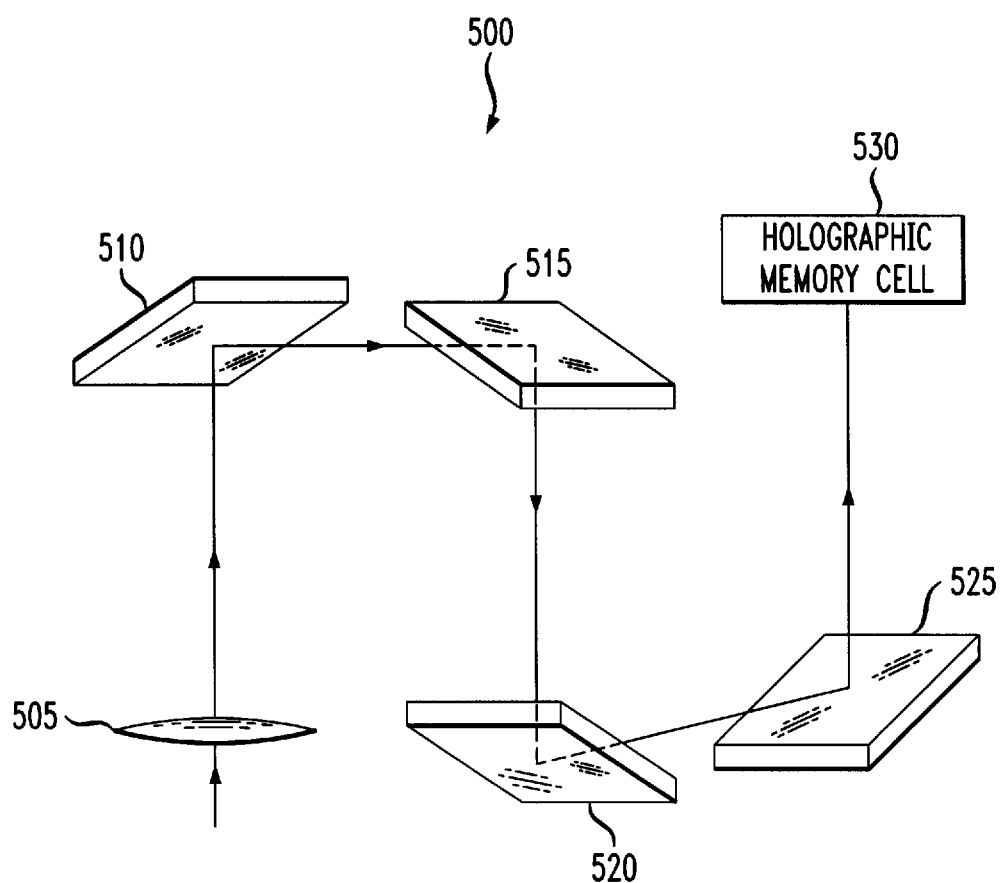
FIG. 5 illustrates a compound Fresnel region beam steering system according to a third embodiment of the present invention.

FIG. 5 illustrates compound Fresnel region beam steering system 500 according to a third embodiment of the present invention. Beam steering system 500 is capable of steering an object beam in two separate axes, for example, a pair of orthogonal axes. For simplicity, beam steering system 500 omits the light source, spatial light modulators, and translation and/or rotation control devices depicted in FIGS. 1–4.

Lens 505 is the final lens of an imaging system, such as a single lens imaging system or a 4-f imaging system. The object beam transmitted from lens 505 is reflected by mirror 510 and mirror 515. Mirror 510 and mirror 515 comprise a first Fresnel region beam steering subsystem, wherein mirror 510 and mirror 515 may be a pair of translating mirrors or a pair of rotating mirrors. Mirror 510 and mirror 515 steer the object beam across the surface of mirror 520 along a first axis, arbitrarily designated as the X-axis.

The object beam is then reflected by mirror 520 and mirror 525. Mirror 520 and mirror 525 comprise a second Fresnel region beam steering subsystem, wherein mirror 520 and mirror 525 may be a pair of translating mirrors or a pair of rotating mirrors. Mirror 520 and mirror 525 steer the object beam across the surface of holographic memory cell (HMC) 530 along a second axis, arbitrarily designated as the Y-axis, wherein the Y-axis is for, example, orthogonal to the X-axis.

Thus, for any arbitrarily selected position of mirror pair 520 and 525, translation (or rotation as the case may be) of mirror pair 510 and 515 results in translation of the object beam at the surface of HMC 530 along the X-axis. Likewise, for any arbitrarily selected position of mirror pair 510 and 515, translation (or rotation as the case may be) of mirror pair 520 and 525 results in translation of the object beam at the surface of HMC 530 in the orthogonal Y-axis.

The beam steering subsystems used in each axis of compound beam steering system 500 are independent of each other. Beam steering system 500 may therefore comprise two pairs of rotating mirrors, two pairs of translating mirrors, or a pair of rotating mirrors and a pair of translating mirrors.

In alternate embodiments of the present invention, the steering systems described above may be used for coarse control steering of the object beam across the holographic memory cell, while fine control scanning may be achieved by physically translating the SLM before imaging. It will be appreciated by those skilled in the art that translating the SLM by an amount R produces a translation of the output image by an amount $-R(f_2/f_1)$ in a 4-f imaging system, where $f_1$ is the focal length of the first lens the object beam encounters and $f_2$ is the focal length of the second lens the object beam encounters. It will also be appreciated by those skilled in the art that translating the SLM by an amount R produces a translation of the output image by an amount $-R(d/s)$ in a single lens imaging system.

Image steering systems that translate the SLM are described in greater detail in U.S. patent application Ser. No. 08/881,579, entitled "System and Method Using Linear Translation to Access Data Locations in a Holographic Memory" and filed concurrently herewith.

The one-dimensional (1D) and two-dimensional (2D) beam steering systems may be further improved by utilizing a "mirror image" setup of mirrors on the opposing side of the holographic memory cell. In this way, data may be steered onto two sides of the HMC simultaneously. As will be explained below in connection with FIG. 6, a "mirror image" optical setup on the opposing side of the HMC may also be used to retrieve data from the HMC, if the spatial light illuminator is replaced with a two-dimensional array of light sensitive detectors.

Figure 6:
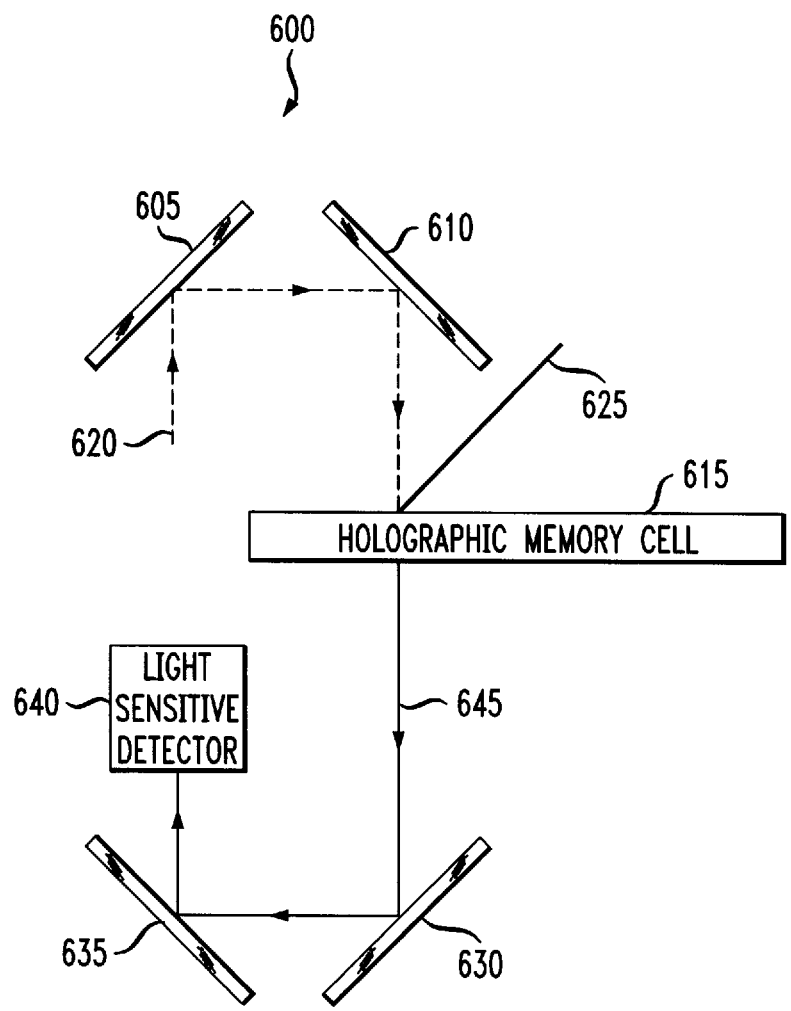
FIG. 6 illustrates a holographic memory system according to a fourth embodiment of the present invention.

FIG. 6 illustrates holographic memory system 600 according to a fourth embodiment of the present invention. Mirror 605 and mirror 610 comprise a Fresnel region beam steering system for steering object beam 620 (shown as a dotted line) onto holographic memory cell (HMC) 615. Mirrors 605 and 610 may comprise a pair of translating mirrors or a pair of rotating mirrors. Object beam 620 may be received from either a 4-f imaging system or a single lens imaging system (not shown).

As previously described, reference beam 625 (shown as a solid line) and object beam 620 interact to produce a holographic image at a selected position. The position is determined by the relative positions of mirrors 605 and 610 if mirrors 605 and 610 are a pair of translating mirrors. Alternatively, the position of the holographic image is determined by the relative angles of mirrors 605 and 610 if mirrors 605 and 610 are a pair of rotating mirrors. The hologram is a function of the relative amplitudes and polarization states of, and the phase differences between, object beam 620 and reference beam 625, and the angles at which object beam 620 and reference beam 625 are projected onto HMC 615.

Data is retrieved using mirror 630 and mirror 635, which comprise a "mirror image" of mirror 610 and mirror 605. Object beam 620 may be reconstructed by projecting reference beam 625 into HMC 615 at the same angle and position used to produce the hologram. The reference and reference beam 625 interact to reproduce the reconstructed object beam 645 (shown as a solid line). If mirrors 605 and 610 are translating mirrors, the desired data page may be selected by translating mirrors 630 and 635 to the same relative positions to which mirrors 605 and 610 were translated when the holograph was formed. If mirrors 605 and 610 are rotating mirrors, the desired data page may be selected by rotating mirrors 630 and 635 to the same relative angles to which mirrors 605 and 610 were rotated when the holograph was formed.

Reconstructed object beam 645 is then projected onto light sensitive detector 640, which reads back the data by sensing the pattern of light and dark pixels. Advantageously, mirrors 630 and 635 not only "de-steer" reconstructed object beam 645 onto detector 640, but they also correct for off-axis distortion effects that may be caused by mirrors 605 and 610.

Although the above-described beam steering systems are utilized to steer an object beam to selected positions on a holographic memory cell, this is by way of illustration only and should not be construed to limit the scope of the present invention in any way. Those skilled in the art will appreciate that the beam steering systems disclosed herein may be readily adapted to steer a reference beam instead.

Although the present invention has been described in detail, those skilled in the art should understand that they can make various changes, substitutions and alterations herein without departing from the spirit and scope of the invention in its broadest form.

What is claimed is:

1. A system for steering a complex, spatially-modulated incident beam of coherent light to gain access to data locations in a holographic memory cell (HMC), comprising:

a refractive element that receives said incident beam of coherent light;

first and second reflective elements locatable to receive and reflect said incident beam in a Fresnel region thereof; and a reflective element steering mechanism, coupled to said first and second reflective elements, that moves said first and second reflective elements in tandem to steer said incident beam with respect to said HMC thereby to cause said incident beam to illuminate a location on said HMC that is a function of a movement of said first and second reflective elements.

2. The system as recited in claim 1 wherein said reflective element steering mechanism rotates said first and second reflective elements about first and second axes, respectively.

3. The system as recited in claim 1 wherein said reflective element steering mechanism translates said first and second reflective elements in tandem.

4. The system as recited in claim 1 further comprising an incident beam of coherent light having a space bandwidth product (SBP) of at least 100.

5. The system as recited in claim 1 wherein said first and second reflective elements are mirrors.

6. The system as recited in claim 1 further comprising:

third and fourth reflective elements locatable to receive and reflect said incident beam from said second reflective element in a Fresnel region thereof; and a second reflective element steering mechanism, coupled to said third and fourth reflective elements, that moves said third and fourth reflective elements in tandem to steer said incident beam with respect to said HMC in two dimensions thereby to cause said incident beam to illuminate a location on a plane of said HMC that is a function of a movement of said first, second, third and fourth reflective elements.

7. The system as recited in claim 1 wherein said HMC is substantially planar.

8. A method of steering a complex, spatially-modulated incident beam of coherent light to gain access to data locations in a holographic memory cell (HMC), comprising the steps of:

receiving the complex, spatially-modulated incident beam of light into a refractive element;

reflecting said incident beam in a Fresnel region thereof with first and second reflective elements; and moving said first and second reflective elements in tandem to steer said incident beam with respect to said HMC thereby to cause said incident beam to illuminate a location on said HMC that is a function of a movement of said first and second reflective elements.

9. The method as recited in claim 8 wherein said step of moving comprises the step of rotating said first and second reflective elements about first and second axes, respectively.

10. The method as recited in claim 8 wherein said step of moving comprises the step of translating said first and second reflective elements in tandem.

11. The method as recited in claim 8 further comprising the step of radiating an incident beam of coherent light having a space bandwidth product (SBP) of at least 100.

12. The method as recited in claim 8 wherein said first and second reflective elements are mirrors.

13. The method as recited in claim 8 further comprising the steps of:

reflecting said incident beam from said second reflective element in a Fresnel region thereof with third and fourth reflective elements; and moving said third and fourth reflective elements in tandem to steer said incident beam with respect to said HMC in two dimensions thereby to cause said incident beam to illuminate a location on a plane of said HMC that is a function of a movement of said first, second, third and fourth reflective elements.

14. The method as recited in claim 8 wherein said HMC is substantially planar.

15. A system for steering a complex, spatially-modulated incident beam of coherent light to gain access to data locations in a substantially planar holographic memory cell (HMC), comprising:

a light source;

a spatial light modulator located to modulate a beam of light received from said light source;

a refractive element that receives said beam from said spatial light modulator;

first and second reflective elements locatable to receive and reflect said beam in a Fresnel region thereof; and a reflective element steering mechanism, coupled to said first and second reflective elements, that moves said first and second reflective elements in tandem to steer said beam with respect to said HMC thereby to cause said beam to illuminate a location on said HMC that is a function of a movement of said first and second reflective elements.

16. The system as recited in claim 15 wherein said reflective element steering mechanism rotates said first and second reflective elements about first and second axes, respectively.

17. The system as recited in claim 15 wherein said reflective element steering mechanism translates said first and second reflective elements in tandem.

18. The system as recited in claim 15 further comprising an incident beam of coherent light having a space bandwidth product (SBP) of at least 100.

19. The system as recited in claim 15 wherein said first and second reflective elements are mirrors.

20. The system as recited in claim 15 further comprising:

third and fourth reflective elements locatable to receive and reflect said beam from said second reflective element in a Fresnel region thereof; and a second reflective element steering mechanism, coupled to said third and fourth reflective elements, that moves said third and fourth reflective elements in tandem to steer said beam with respect to said HMC in two dimensions thereby to cause said beam to illuminate a location on a plane of said HMC that is a function of a movement of said first, second, third and fourth reflective elements.

* * * * *